United States Patent
Lim et al.

(10) Patent No.: US 8,682,657 B2
(45) Date of Patent: Mar. 25, 2014

(54) APPARATUS AND METHOD FOR IMPROVING COMMUNICATION SOUND QUALITY IN MOBILE TERMINAL

(75) Inventors: Ji-Hyuk Lim, Gyeonggi-do (KR);
Jang-Young Ryu, Gyeonggi-do (KR);
Dong-Seon Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 389 days.

(21) Appl. No.: 13/107,070

(22) Filed: May 13, 2011

(65) Prior Publication Data

US 2011/0282659 A1    Nov. 17, 2011

(30) Foreign Application Priority Data

May 17, 2010   (KR) .................. 10-2010-0045865

(51) Int. Cl.
*G10L 21/02* (2013.01)

(52) U.S. Cl.
USPC .......................... 704/226; 704/278; 704/272

(58) Field of Classification Search
USPC ............... 704/226, 227, 200, 233, 278, 272, 704/200.1; 381/71.1, 318; 367/125
See application file for complete search history.

(56) References Cited

U.S. PATENT DOCUMENTS

| | | | | |
|---|---|---|---|---|
| 6,639,986 B2 * | 10/2003 | Kanamori et al. | ............ | 381/71.1 |
| 6,876,751 B1 * | 4/2005 | Gao et al. | ............ | 381/318 |
| 7,366,662 B2 * | 4/2008 | Visser et al. | ............ | 704/227 |
| 7,983,907 B2 * | 7/2011 | Visser et al. | ............ | 704/227 |
| 2008/0181058 A1 * | 7/2008 | Hayakawa | ............ | 367/125 |

* cited by examiner

*Primary Examiner* — Huyen X. Vo
(74) *Attorney, Agent, or Firm* — Cha & Reiter, LLC

(57) ABSTRACT

An apparatus and a method for improving communication sound quality in a mobile terminal in order to remove a neighboring noise that occurs together with a user's voice signal in a mobile terminal by discriminating signals occurring at different distances using two microphones and removing a noise. The mobile terminal preferably includes a first microphone, a second microphone, and a voice processor. The first microphone receives a voice signal occurring at a closer distance from the mobile terminal and a voice signal occurring at a longer distance from the mobile terminal. The second microphone receives only a voice signal occurring at the long distance. The voice processor discriminates between the signal occurring at the long distance and the signal occurring at the close distance by receiving voice signals received via the first microphone and the second microphone at different phases.

16 Claims, 5 Drawing Sheets

APPARATUS AND METHOD FOR IMPROVING COMMUNICATION SOUND QUALITY IN MOBILE TERMINAL

CLAIM OF PRIORITY

This application claims the benefit under 35 U.S.C. §119(a) from a Korean patent application filed in the Korean Intellectual Property Office on May 17, 2010 and assigned Serial No. 10-2010-0045865, the entire disclosure of which is hereby incorporated by reference in its entirety.

BACKGROUND OF THE INVENTION

1. Field of the Invention

The present invention relates to an apparatus and a method for improving communication sound quality in a mobile terminal. More particularly, the present invention relates to an apparatus and a method for removing a noise that negatively impacts a user's voice signal in a mobile terminal.

2. Description of the Related Art

Recently, mobile terminals have become indispensable necessities to modern people and are used regardless of age or sex. Accordingly, service providers and terminal manufacturers are competitively developing a plurality of ever increasing products and/or services for such mobile terminals in an attempt to distinguish themselves from other competitors.

For example, the mobile terminal has developed to a multimedia apparatus that can provide a phonebook, a game, a Short Message Service (SMS), an Electronic (E)-mail, a morning call and/or alarm feature, a Motion Picture Expert Group (MPEG)-1 or MPEG-2 Audio Layer-3 (MP3) player, a schedule management function, a digital camera, and a wireless Internet service, in order to provide a variety of services.

The mobile terminal is a device that has developed mainly for the purpose of voice communication and should accurately transfer a user's voice to a counterpart user and accurately receive the counterpart user's voice.

Conventional mobile terminals have accomplished the above purpose by improving communication quality but in the case where a neighboring/external noise and a user's voice signal co-exist, a technology for removing the neighboring noise is poor.

Typically, the mobile terminal uses an Automatic Gain Control (AGC) function for removing only a neighboring noise which has a lower volume than a user's voice in order to remove the neighboring noise. The reason behind removing only sound with a lower volume is because it is difficult for the mobile terminal to discriminate the user's voice from the neighboring noise.

In addition, the mobile terminal may exhibit a reduction in communication sound quality due to a noise caused by internal power and thereby cause a great deal of inconvenience to a user.

Therefore, there is a long-felt need in the art for an apparatus and a method for discriminating a user's voice from a neighboring noise in a mobile terminal and removing a noise caused by internal power of the mobile terminal.

SUMMARY OF THE INVENTION

An exemplary aspect of the present invention is to provide an apparatus and a method for improving communication quality of a mobile terminal, particularly with regard to sound.

Another exemplary aspect of the present invention is to provide an apparatus and a method for providing a differential microphone effect using two microphones in a mobile terminal.

Still another exemplary aspect of the present invention is to provide an apparatus and a method for discriminating a signal depending on a distance in order to remove a noise in a mobile terminal.

In accordance with another exemplary aspect of the present invention, a mobile terminal for improving communication quality is provided. The mobile terminal preferably includes a first microphone for receiving a voice signal occurring at a closer distance relative to the mobile terminal than a voice signal occurring at a longer distance, a second microphone for receiving only a voice signal occurring at the longer distance, and a voice processor for discriminating between the signal occurring at the longer distance and the signal occurring at the closer distance by receiving voice signals received via the first microphone and the second microphone at different phases.

In accordance with another exemplary aspect of the present invention, a method for improving communication quality in a mobile terminal is provided. The method preferably includes receiving a voice signal occurring at a closer distance relative to a microphone and a voice signal occurring at a longer distance via a first microphone, receiving only a voice signal occurring at the long distance via a second microphone, inputting the voice signals received via the respective microphones to a voice processor at different phases, and discriminating between the voice signal occurring at the long distance and the voice signal occurring at the close distance using the voice processor that have received the signals of the different phases.

In accordance with still another exemplary aspect of the present invention, an apparatus for improving communication quality in a mobile terminal is provided. The apparatus preferably includes a first microphone for receiving a voice signal occurring at a close (i.e. proximal or closer to the user speaking) distance relative to the mobile terminal and a voice signal occurring at a long (i.e. distal or further from) distance relative to the mobile terminal and providing the voice signals to a voice processor, a second microphone for receiving only a voice signal occurring at the long (distal) distance and providing the voice signal to the voice processor, and the voice processor for discriminating between the signal occurring at the long (longer relative) distance to the mobile terminal and the signal occurring at the close (closer relative) distance to the mobile terminal by receiving voice signals received via the first microphone and the second microphone at different phases, wherein the first microphone and the second microphone provide the signals received at different phases to the voice processor.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to a person of ordinary skill in the art from the following description taken in conjunction with the accompanying drawings in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Further, for the purposes of clarity and simplicity, descriptions of well-known functions and constructions may be omitted as their inclusion may obscure appreciation of the subject matter of the claimed invention by a person of ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustrative purposes only and is not to be construed as limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

Exemplary embodiments of the present invention provide an apparatus and a method for improving communication quality by discriminating signals between voice and noise occurring at different distances using two microphones and removing the noise.

Figure 1:
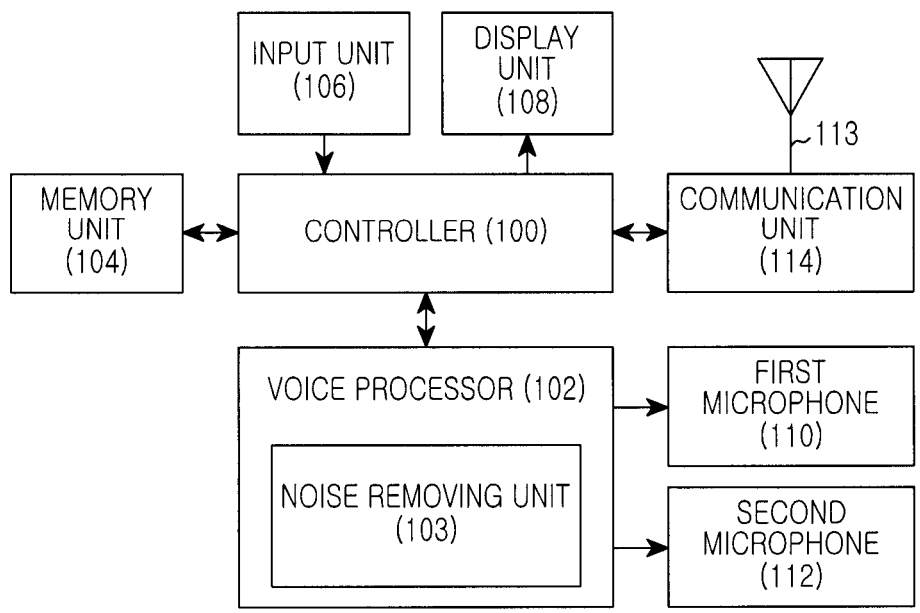
FIG. 1 is a block diagram illustrating a mobile terminal for improving communication quality according to an exemplary embodiment of the present invention.

FIG. 1 is a block diagram illustrating a mobile terminal for improving communication quality according to an exemplary embodiment of the present invention.

Referring now to FIG. 1, the mobile terminal may preferably include a controller 100, a voice processor 102, a memory unit 104, an input unit 106, a display unit 108, a first microphone 110, a second microphone 112, and a communication unit 114. The voice processor 102 may include a noise removing unit 103. The mobile terminal may include additional units that are not illustrated here for sake of clarity. Similarly, the functionality of two or more of the above units may be integrated into a single component.

First, the controller 100 of the mobile terminal controls an overall operation of the mobile terminal. For example, the controller 100 performs processes and controls for voice communication and data communication. In addition to the general functions, the controller 100 discriminates a signal occurring at a close distance and a signal occurring at a long distance using the two microphones, and determines that a signal occurring at the long distance comprises a neighboring noise and removes the neighboring noise from the communication signal.

In other words, the controller 100 controls the voice processor 102 to classify voice signals received via the first microphone 110 and the second microphone 112 into a neighboring noise and a user's voice, and removes the neighboring noise to use only the user's voice for voice communication. A person of ordinary skill in the art should understand and appreciate that while it is likely that both microphones pick up the neighboring noise, it is likely closer to the second microphone.

The voice processor 102 classifies voice signals received via the two microphones (the first microphone 110 and the second microphone 112) into a neighboring noise and a user's voice signal under control of the controller 100. At this point, the voice processor 102 receives signals having different phases, respectively, from the first microphone 110 and the second microphone 112, and cancels the signals having different phases using a known noise cancellation technique and amplifies signals that are in phase.

At this point, the voice processor 102 receives a user's voice signal via one of the two microphones, and receives the neighboring noise via the two microphones at different phases (due in part to the distance sound has to travel) to identify and remove the neighboring noise.

In addition, when a noise caused by an internal battery of the mobile terminal occurs, the voice processor 102 processes to incorporate a signal having the same characteristic as that of the occurring noise into signals occurring at the long distance. Accordingly, the signal having the same characteristic as that of the noise caused by the internal battery is amplified to the same phase before the signal is input to the voice processor 102, and noises that have been changed and amplified to different phases are cancelled at a point at which they are input to the voice processor 102.

Furthermore, when the mobile terminal enters a load speaker mode (i.e. activates speakerphone), the voice processor 102 determines the positions of the first microphone 110 and the second microphone 112 to block a path of a microphone (a microphone close to the speaker) which is a cause of an echo generation.

With continued reference to FIG. 1, the noise removing unit 103 determines the phase of a signal received from the microphone and then can amplify or cancel the received signal depending on the determined phase under control of the voice processor 102.

The memory unit 104 includes non-transitory machine readable medium(s), such as Read Only Memory (ROM), Random Access Memory (RAM), a flash ROM, or other similar storage devices. The ROM stores microcodes of programs for processes and controls of the controller 100 and the voice processor 102, and various reference data.

The RAM serves as a working memory of the controller 100 and preferably stores temporary data that occur during execution of various programs. In addition, the flash ROM preferably stores various updatable data for storage such as a phonebook, calling messages, received messages, information of a user's touch input point, or other similar data.

The input unit 106 includes a plurality of function keys such as numerical key buttons of 0 to 9, a menu button, a cancel button, an OK button, a TALK button, an END button, an Internet access button, navigation key (directional key) buttons, letter input keys, and other similar input keys and buttons. The input unit 106 provides key input data corresponding to a key pressed by a user to the controller 100. A person of ordinary skill in the art understands and appreciates that in the claimed invention the keys could be virtual and the input unit and the display unit may comprise a single touch screen.

The display unit 108 displays status information generated during an operation of the mobile terminal, a limited number of letters, a large amount of moving images, still images, and the like. The display unit 108 may be a color Liquid Crystal Display (LCD), an Active Mode Organic Light Emitting Diode (AMOLED) display, and other types of thin-film technology screen display apparatuses. The display unit 108 may include a touch unit, and when it is applied to a touch input type mobile terminal, the touch unit can be used as an input unit.

The microphones (the first microphone and the second microphone) are separated by a maximum distance from each other to discriminate and receive signals depending on a signal occurrence distance. Each microphone provides received signals to the voice processor 102 as signals which have differing phase values.

For example, the first microphone 110 may receive both a signal from sound occurring at a closer distance and a signal from sound occurring at a longer distance. The second microphone may receive only a signal occurring at the long distance. Here, the signal occurring at the close distance denotes a voice signal generated by a user in person, and the signal occurring at the long distance denotes a noise occurring in the neighborhood. Accordingly, the position of the first microphone 110 may be arranged at the position of a microphone of a general mobile terminal, and the position of the second microphone 112 may be the position of the speaker of the general mobile terminal.

In addition, the first microphone 110 provides received signals (a signal occurring at the long distance and a signal occurring at the close distance and) to a "positive" input of the voice processor 102. The second microphone 112 provides received signals (signals occurring at the long distance) to a "negative" input of the voice processor 102, so that the signals occurring at the long distance are input at different phases values.

The communication unit 114 transmits/receives a Radio Frequency (RF) signal of data input/output via an antenna 113. For example, during transmission, the communication unit 114 may channel-code and spread data to be transmitted (when utilizing a spread spectrum such as CDMA), and then performs an RF process on the signal to transmit the signal. During reception, in this particular example. the communication unit 114 converts a received RF signal into a baseband signal, and despreads and channel-decodes the baseband signal to recover data. As previously stated, the presently claimed invention is not limited to mobile devices utilizing spread spectrum communication units. For example, TDMA, ODMA, GSM, or other types of communication protocols can be used.

The function of the voice processor 102 may be performed by the controller 100 of the mobile terminal. The separate configuration and illustration of the voice processor 102 are an exemplary purpose only for convenience in describing an exemplary embodiment, not for limiting the scope of the present invention. Various modifications can be made to the claimed invention, for example, all functions of the voice processor 102 can be processed by the controller 100.

Figure 2:
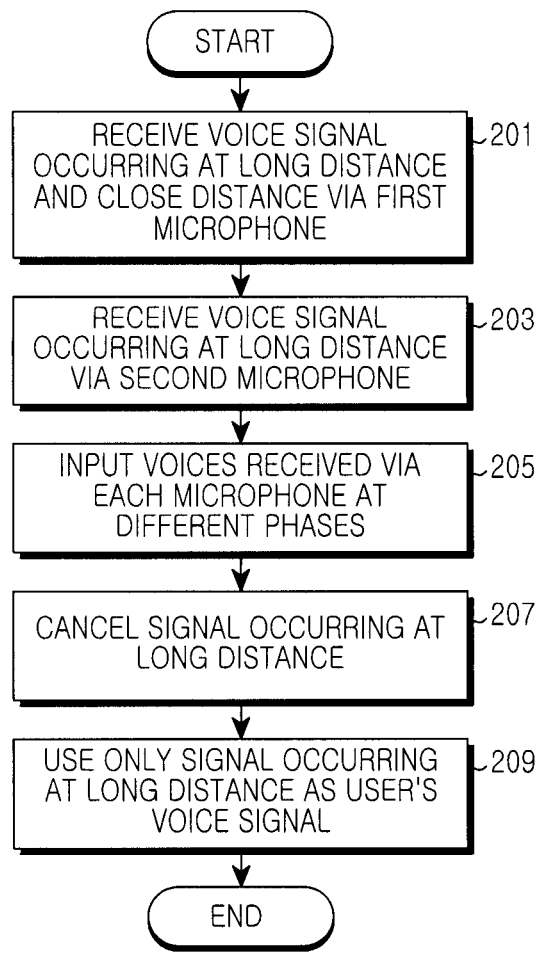
FIG. 2 is a flowchart illustrating a process for performing voice communication whose sound quality has been improved in a mobile terminal according to an exemplary embodiment of the present invention.

FIG. 2 is a flowchart illustrating a process for performing voice communication whose sound quality has been improved in a mobile terminal according to an exemplary embodiment of the present invention.

Referring now to FIG. 2, the mobile terminal has two microphones (110 and 112 shown in FIG. 1, for example), and the two microphones are separated by a distance from each other. For example, 5 cm distance between the two microphones is operable distance for the embodiment of the present invention. By the way, generally, the more the distance between the two microphones, the better the elimination function of the noise is. Therefore, a position of the second microphone 110 may be arranged at the upper position of a general mobile terminal and a position of the first microphone 112 may be arranged at the lower position of the mobile terminal. The first microphone 110 may receive both a signal occurring at a closer distance and a signal occurring at a longer distance relative to the speaker. The second microphone 112 may receive only a signal occurring at the long distance. The signal occurring at the long distance denotes a neighboring noise (i.e. noise other than a user's voice), and the signal occurring at the close distance denotes a voice signal of the user who uses the mobile terminal. The first microphone 110 receives both the neighboring noise and the user's voice signal. The second microphone 112 receives only a neighboring noise.

To improve sound quality of voice communication, the mobile terminal processes receipt of both a signal occurring at the closer distance and a signal occurring at the longer distance relative to the source of the sound, such as a person speaking via the first microphone 110 in step 201. In other words, the mobile terminal receives both the user's voice for voice communication and the neighboring noise occurring in the neighborhood via the first microphone.

The mobile terminal receives only a signal occurring at the longer distance via the second microphone 112 in step 203.

Here, the first microphone 110 denotes a microphone mounting a voice microphone on a general mobile terminal in order to receive a voice signal of a user occurring at the close distance. The second microphone 112 may be mounted on a diagonal position which is separated by a maximum distance from the first microphone 110 according to an exemplary embodiment of the present invention.

The mobile terminal inputs voice signals received to each microphone at different phases in step 205.

Step 205 provides inputting neighboring noises to the voice processor at different phases in order to cancel the neighboring noises received from the long distance via the two microphones. In step 205, a neighboring noise and the user's voice signal received via the first microphone 110 are provided to a positive input of the voice processor 102, and a neighboring noise received via the second microphone 112 is provided to a negative input of the voice processor 102.

Accordingly, the voice processor 102 receives neighboring noises input via the first microphone 110 and the second microphone 112 such that they are inverted with respect to each other, and receives the user's voice signal input via the first microphone 110.

At step 207, the mobile terminal then cancels neighboring noises input from the long distance, and at step 209 processes only the user's voice signal occurring at the close distance such that the user's voice signal is used for voice communication. This cancellation of neighboring noises is for canceling inverted neighboring noises input to the voice processor 102, and then using only the user's voice signal input via the first microphone 110.

Figure 3:
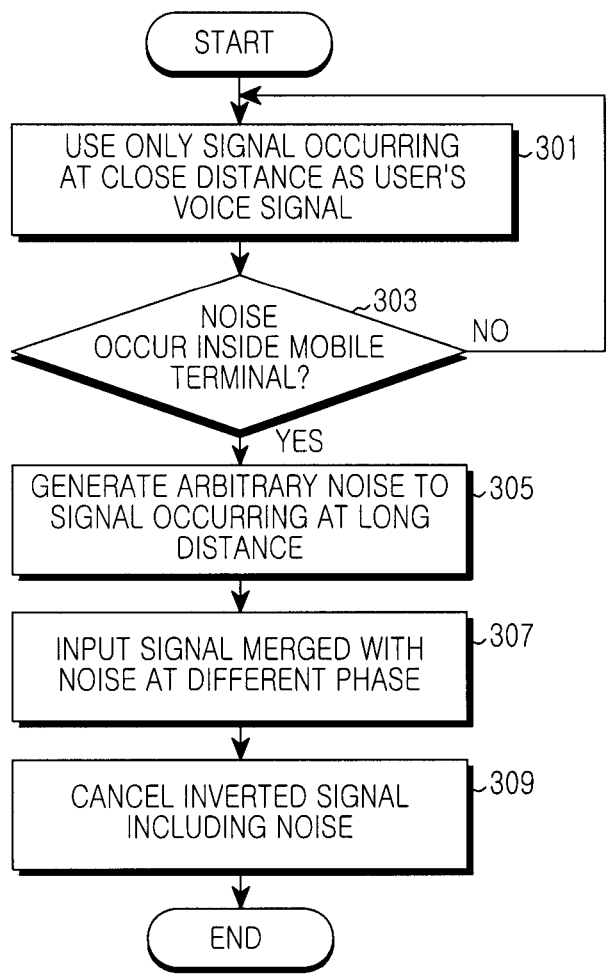
FIG. 3 is a flowchart illustrating a process for removing a noise occurring inside a mobile terminal according to an exemplary embodiment of the present invention.

FIG. 3 is a flowchart illustrating a process for removing a noise occurring inside a mobile terminal according to an exemplary embodiment of the present invention.

Referring now to FIG. 3, the mobile terminal denotes a terminal that uses a Time Division Multiple Access (TDMA) scheme, and generates a noise caused by radiation that uses time division. This denotes that a noise by battery power inside the mobile terminal occurs at the same timing (i.e. in a same time slot).

To remove a power noise occurring in the inside, the mobile terminal uses only a signal occurring at a close (closer) distance to the mobile terminal for the user's voice signal in step 301, and determines whether it is a timing at which a noise by the battery power occurs inside the mobile terminal in step 303. The closer distance can be determined by, for example, volume or amplitude which is received at the first microphone.

When it is not the timing (time slot) at which the noise by the battery power occurs in step 303, the mobile terminal repeatedly performs the process of step 301.

In contrast, when it is the timing at which the noise by the battery power occurs in step 303, the mobile terminal proceeds to step 305 to generate an arbitrary noise such as a received noise signal occurring at a long (longer) distance through a first and second microphones. The received noise signal is not a voice of user which is received at the second microphone, and is an external noise except the voice of user. A volume of the external noise is larger than the voice of user.

The mobile terminal inputs signals of the long distance to which the arbitrary noise has been generated to the voice processor 102 at different phases in step 307, and cancels signals including the arbitrary noise in step 309.

This process for generating an arbitrary noise that is the same as a noise by the battery power to a neighboring noise (a neighboring noise input as a positive input and a neighboring noise input as a negative input) for cancelation in the exemplary embodiment of the present invention. Accordingly, the noise by the battery power and the arbitrary noise become signals having the same phase and different potentials and are merged (amplified), and input to the voice processor at different phases, so that the two noises will be cancelled. In other words, the inverted signal including noise is canceled.

After that, the mobile terminal ends the present algorithm.

Figure 4:
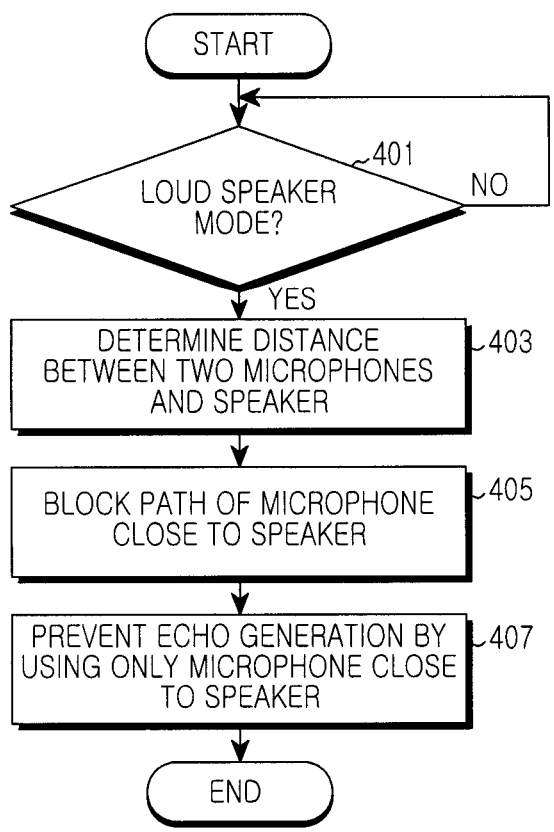
FIG. 4 is a flowchart illustrating a process for operating a loud speaker mode in a mobile terminal according to an exemplary embodiment of the present invention.

FIG. 4 is a flowchart illustrating a process for operating a loud speaker mode in a mobile terminal according to an exemplary embodiment of the present invention.

Referring now to FIG. 4, to remove a neighboring noise, the mobile terminal includes a first microphone 110 and a second microphone 112 (shown in FIG. 1). As described above, to discriminate the purpose of a microphone that can receive a signal depending on a signal occurrence distance, the two microphones are configured to maintain a maximum distance with respect to each other.

The first microphone 110 of the two microphones in this particular case denotes a microphone that is typical of a microphone for a mobile terminal, for receiving a user's voice signal, and the second microphone 112 may be arranged at the around speaker of a general mobile terminal. Accordingly, the position of the second microphone is far from the first microphone 110 and may be arranged closer to a loudspeaker position of the mobile terminal.

Typically a first microphone and a loudspeaker are positioned at distance so that one can hear from the loudspeaker and speaker into the microphone. While the distance between a microphone and a loudspeaker of a mobile terminal is typically less than a conventional wired phone, in wireless mobile terminals the loudspeaker and microphone are usually at opposite ends, somewhere on order of, for example, 6-10 cm from each other.

Generally, when the microphone and the loudspeaker get close, echo occurs and the echo has an influence on a neighboring noise removing performance of the exemplary embodiment of the present invention.

To solve the above problem, the mobile terminal determines whether the user of the mobile terminal intends to use a loudspeaker mode in step 401 (i.e. speakerphone mode).

When the user does not intend to use the loud speaker mode in step 401, the mobile terminal repeatedly performs the process of step 401.

In contrast, when the user intends to use the loudspeaker mode in step 401, the mobile terminal proceeds step 403 to determine a distance between two microphones and a speaker. Step 403 determines a distance between microphones that may generate an echo under influence of the loudspeaker in the mobile terminal.

The mobile terminal having determined the microphone that may generate the echo under influence of the speaker blocks a path of a microphone close to the speaker in step 405, and uses only the microphone close to the speaker to prevent echo generation by the speaker in step 407.

In case of entering the loud speaker mode using the mobile terminal according to an exemplary embodiment of the present invention, since the user's voice signal is input via the first microphone 110 and the second microphone 112 similarly to a neighboring noise occurring at the long distance, use of the microphone that may be influenced by the speaker is limited.

The mobile terminal that has blocked the path of the microphone generating echo under influence of the loudspeaker ends the present algorithm while performing the loudspeaker mode.

Figure 5:
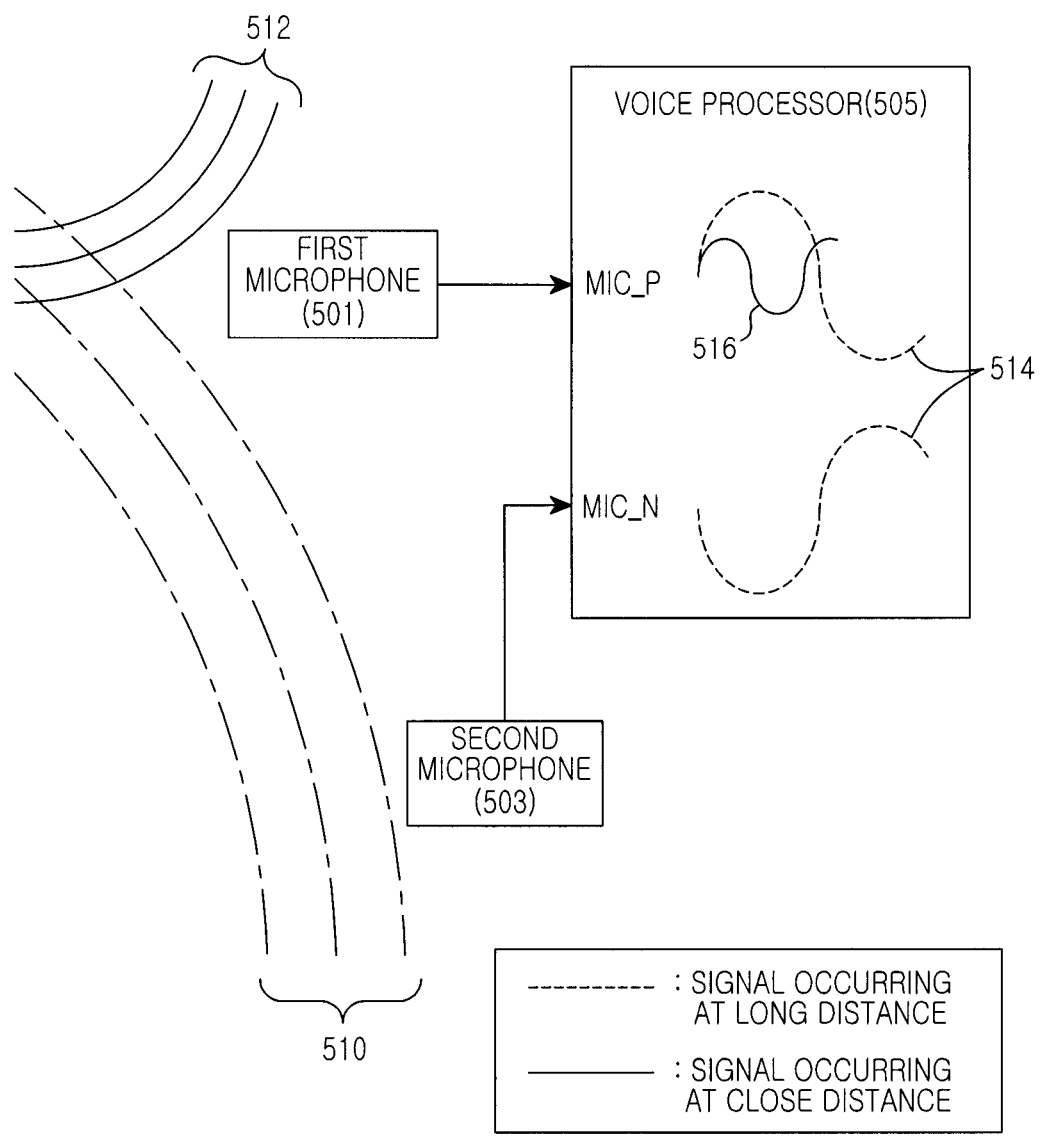
FIG. 5 is a flowchart illustrating a process for removing a neighboring noise in a mobile terminal according to an exemplary embodiment of the present invention.

FIG. 5 is a flowchart illustrating a process for removing a neighboring noise in a mobile terminal according to an exemplary embodiment of the present invention.

Referring now to FIG. 5, as described above, to remove a neighboring noise according to an exemplary embodiment of the present invention, the mobile terminal includes a first microphone 501 and a second microphone 503. For discrimination purposes of which microphone can receive a signal depending on a signal generation distance, the two microphones are configured to maintain a maximum distance with respect to each other, typically at opposite positions of the mobile terminal along its longest side.

Accordingly, as illustrated, the first microphone 501 may receive both a signal 510 (neighboring noise) occurring at a long distance and a signal 512 (a user's voice signal) occurring at a close (closer) distance to the mobile terminal than the neighboring noise.

In addition, as illustrated, the second microphone 503 may receive only the signal 510 (the neighboring noise) occurring at the longer distance from the mobile terminal, and the second microphone is arranged at the maximum distance from the first microphone 501.

The voice processor 505 receives a voice signal received via each of the microphones 501, 503, and determines the phase of the received voice signal to cancel signals having different phases.

In the case where the user of the mobile terminal having the above construction performs voice communication, a noise occurring in the neighborhood may be input via the microphone.

Accordingly, since the microphone receives both the user's voice signal and a noise occurring in the neighborhood (or area of the mobile terminal), the mobile terminal transfers not only the user's voice but also the noise occurring in the neighborhood, so that a counterpart user may feel inconvenience in listening to the user's accurate voice.

Thus to solve the above problem, according to the present invention, when providing signals (a neighboring noise and the user's voice) input to the microphones 501 and 503 to the voice processor 505, the mobile terminal provides signals having different phases.

As illustrated, the first microphone 501 that has received the signal (the neighboring noise 510) occurs at the longer distance and the signal (the user's voice signal 512) occurring at the closer distance provides the received signals to a positive input of the voice processor 505, and the second microphone 505 that has received only the signal (the neighboring noise 510) occurring at the long distance provides the received signal to a negative input of the voice processor 505.

Accordingly, the voice processor 505 receives the signal (the neighboring noise) occurring at the longer distance and the signal (the user's voice signal) occurring at the closer distance as the positive input, and receives the signal (the neighboring noise) occurring at the long distance as the negative input.

Accordingly, the signals (the neighboring noises) occurring at the long distance and received as the positive input and the negative input are mutually cancelled, and only a signal 516 (received the user's voice signal through the first microphone 501) occurring at the close distance and received as the positive input remains, so that communication sound quality of the mobile terminal may be improved. This provides a differential MIC effect using the two microphones in the mobile terminal.

When a noise by the battery power occurs inside the mobile terminal, the mobile terminal generates an arbitrary noise (an artificial noise) having the same phase as that of a noise by the battery power to a signal (a neighboring noise) occurring at a long distance.

The signal (the neighboring noise) occurring at the long distance and including the arbitrary noise has the same phase as that of the noise by the battery power and is merged with the noise by the battery power, and the signal (the neighboring noise) occurring at the long distance, merged with the noise will be input to the voice processor at a different phase. Accordingly, the signal occurring at the long distance and including the noise by the battery power is cancelled at a different phase, so that both the noise by the battery power and the noise occurring at the long distance are removed.

In addition, in the case where the mobile terminal enters the loudspeaker (i.e. speakerphone) mode, a user's voice becomes a signal having the same characteristic as a signal occurring at the long distance. Accordingly, the mobile terminal blocks the path of a microphone closer to the loudspeaker to reduce echo occurring under influence of the speaker.

As described above, exemplary embodiments of the present invention provide an apparatus and a method for improving communication quality of a mobile terminal. The present invention may improve communication quality by discriminating between signals occurring at different distances using two microphones and removing a noise, and resolving a problem that a neighboring noise and a user's voice signal are received in the conventional mobile terminal.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal for improving communication quality, the mobile terminal comprising:
a first microphone for receiving a first voice signal occurring at a first distance from the mobile terminal;
a second microphone for receiving a second voice signal occurring at a second distance from the mobile terminal, the second distance being greater than the first distance; and
a voice processor for discriminating between the second voice signal occurring at the second distance and the first voice signal occurring at the first distance by receiving an input of the voice signals received via the first microphone and the second microphone into the voice processor at different phases;
wherein when a noise generated by internal power inside the mobile terminal occurs, the voice processor generates an arbitrary noise having the same characteristic as that of the noise generated by the internal power into the second voice signal.

2. The mobile terminal of claim 1, wherein the voice processor receives as an input the second voice signal occurring at the second distance and the first voice signal occurring at the first distance as a positive input from the first microphone, and receives the second voice signal occurring at the second distance as a negative input from the second microphone, and the voice processor discriminates between signals having different phases as voice signals occurring at the second distance.

3. The mobile terminal of claim 1, wherein the voice processor discriminates between the second voice signal occurring at the second distance and the first voice signal occurring at the first distance, and then cancels the second voice signal occurring at the second distance.

4. The mobile terminal of claim 1, wherein the second voice signal occurring at the second distance comprises neighboring noise, and the first voice signal occurring at the first distance comprises a user-generated voice signal.

5. The mobile terminal of claim 1, wherein the voice processor receives the arbitrary noise merged with the noise generated by the internal power as a signal having a different phase, and cancels the second voice signal having the different phase.

6. The mobile terminal of claim 1, wherein while operating in a loudspeaker mode, the voice processor blocks a path of a microphone closer to a loudspeaker.

7. The mobile terminal of claim 1, wherein the first microphone and the second microphone are set apart from each other by a predetermined distance.

8. A method for improving communication quality in a mobile terminal, the method comprising:
    receiving a first voice signal occurring at a first distance relative to the mobile terminal via a first microphone;
    receiving a second voice signal occurring at a second distance relative to the mobile terminal via a second microphone, the second distance being greater than the first distance;
    inputting the first and second voice signals received via the respective first and second microphones to a voice processor at different phases; and
    discriminating between the second voice signal occurring at the second distance and the first voice signal occurring at the first distance by using the voice processor;
    when a noise generated by operation of internal power inside the mobile terminal occurs, incorporating an arbitrary noise having the same characteristic as that of the noise generated by the operation of the internal power into the second voice signal occurring at the second distance.

9. The method of claim 8, wherein the discriminating between the second voice signal occurring at the second distance and the first voice signal occurring at the first distance comprises:
    receiving the second voice signal occurring at the second distance and the first voice signal occurring at the first distance as a positive input from the first microphone;
    receiving the second voice signal occurring at the second distance as a negative input from the second microphone; and
    treating a signal having a different phase as being the second voice signal occurring at the longer distance.

10. The method of claim 8, wherein the second voice signal occurring at the second distance comprises neighboring noise and the first voice signal occurring at the first distance comprises a voice signal generated by a user.

11. The method of claim 8, further comprising:
    merging the second voice signal occurring at the second distance and including the arbitrary noise with the noise generated by the operation of the internal power;
    inputting the merged signal to the voice processor as a voice signal of a different phase; and
    canceling by the voice processor the voice signal of the different phase.

12. The method of claim 8, further comprising, while operating in a loudspeaker mode, blocking a path of a microphone closest to a speaker.

13. The method of claim 8, wherein the first microphone and the second microphone are set apart from each other by a predetermined distance.

14. An apparatus for improving communication quality in a mobile terminal, the apparatus comprising:
    a first microphone for receiving a first voice signal occurring at a first distance relative to the first microphone and a second voice signal occurring at a second distance relative to the first microphone that is greater than the first distance, and providing the first and second voice signals to a voice processor; and
    a second microphone for receiving the second voice signal occurring at the second distance and for providing the second voice signal to the voice processor;
    wherein the voice processor is configured to discriminate between the second voice signal occurring at the second distance and the first voice signal occurring at the first distance by receiving the voice signals received via the first microphone and the second microphone at different phases,
    wherein when a noise generated by internal power inside the mobile terminal occurs, the voice processor generates an arbitrary noise having the same characteristic as that of the noise generated by the internal power into the second voice signal.

15. The apparatus of claim 14, wherein the voice processor cancels the second voice signal occurring at the second distance from the signals received via the first microphone and the second microphone.

16. The apparatus of claim 14, wherein the voice processor blocks one of the first microphone and the second microphone during a loudspeaker mode.

* * * * *